United States Patent [19]

Yano

[11] Patent Number: 4,760,552
[45] Date of Patent: Jul. 26, 1988

[54] RULED LINE DEVELOPMENT SYSTEM IN A WORD PROCESSING APPARATUS

[75] Inventor: Tomoyuki Yano, Yamatokoriyama, Japan

[73] Assignee: Sharp Kabushiki Kaisha, Osaka, Japan

[21] Appl. No.: 689,513

[22] Filed: Jan. 9, 1985

Related U.S. Application Data

[63] Continuation of Ser. No. 359,290, Mar. 18, 1982, abandoned.

[30] Foreign Application Priority Data

Mar. 19, 1981 [JP] Japan .................................. 56-40886

[51] Int. Cl.⁴ ............................................. G06F 3/153
[52] U.S. Cl. ..................................... 364/900; 340/747
[58] Field of Search ... 364/200 MS File, 900 MS File; 340/364, 709, 747, 751, 752, 756, 789, 790, 798

[56] References Cited

U.S. PATENT DOCUMENTS

| | | | |
|---|---|---|---|
| 3,501,746 | 3/1970 | Vosbury | 364/900 |
| 3,579,193 | 5/1971 | Bernier | 364/900 |
| 3,579,195 | 5/1971 | Hallmark et al. | 364/900 |
| 3,665,450 | 5/1972 | Leban | 340/751 |
| 3,675,208 | 4/1972 | Bard | 364/900 |
| 3,810,166 | 5/1974 | Atkin | 340/798 |
| 3,818,482 | 6/1974 | Yoshida et al. | 340/798 |
| 3,895,374 | 7/1975 | Williams | 340/789 |
| 3,906,480 | 9/1975 | Schwartz et al. | 340/798 |
| 3,974,493 | 8/1976 | de Cavaignac et al. | 340/748 |
| 3,974,494 | 8/1976 | Yamazaki et al. | 340/789 |
| 3,976,982 | 8/1976 | Eiselen | 340/752 |
| 4,041,482 | 8/1977 | Freudeberg et al. | 340/798 |
| 4,190,835 | 2/1980 | Buynak | 340/724 |
| 4,392,130 | 7/1983 | Lundström et al. | 340/747 |
| 4,416,558 | 11/1983 | McInroy et al. | 364/900 |
| 4,417,239 | 11/1983 | Demka et al. | 340/709 |

Primary Examiner—Thomas M. Heckler
Attorney, Agent, or Firm—Birch, Stewart, Kolasch & Birch

[57] ABSTRACT

A ruled line pattern is divided into four line elements, two of them being assigned to represent the vertical rule line and the remaining two elements being assigned to represent the horizontal rule line. Selection keys are provided on a keyboard panel for selecting a desired line element. The ruled line data is of four (4) bit construction and is developed in response to the input operation conducted through the selection keys. The first and the third bits of the ruled line data represent the horizontal rule line, and the second and fourth bits of the ruled line data represent the vertical rule line in each address.

14 Claims, 3 Drawing Sheets

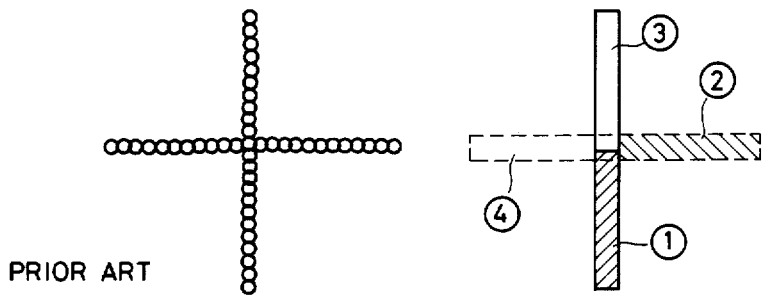
PRIOR ART
FIG. 1
FIG. 2
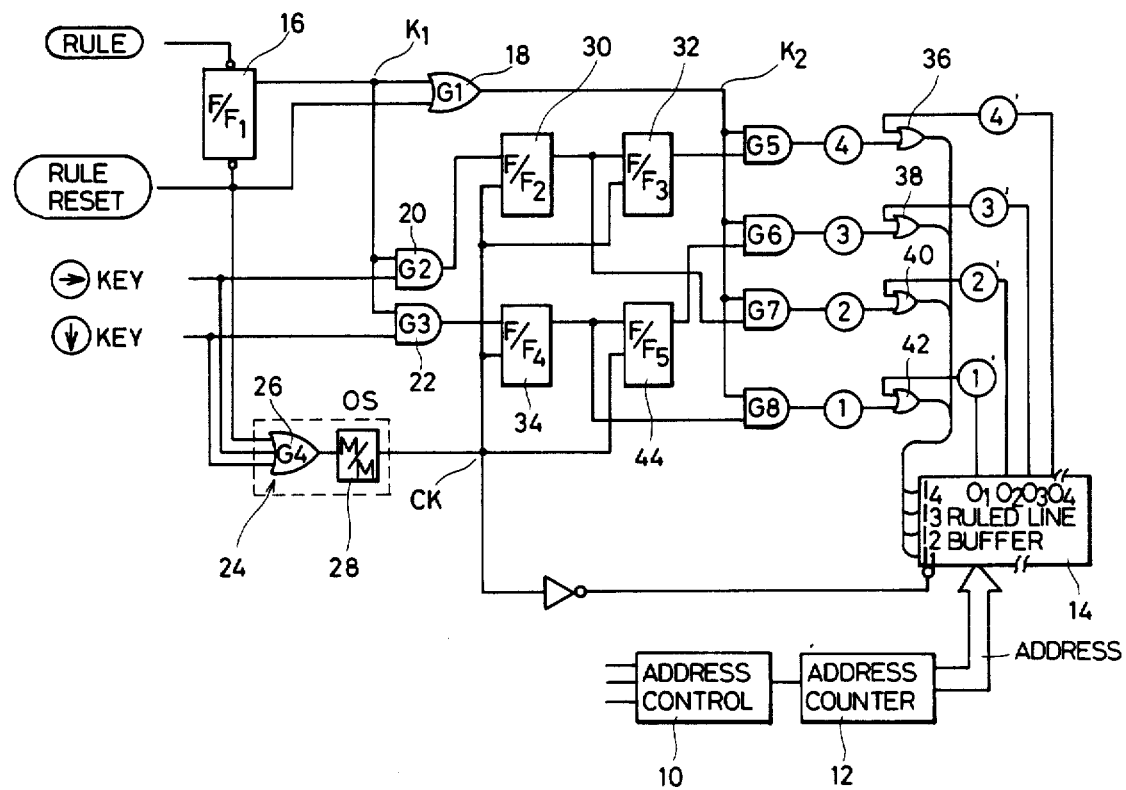
FIG. 3

RULED LINE DEVELOPMENT SYSTEM IN A WORD PROCESSING APPARATUS

This application is a continuation of application Ser. No. 359,290, filed Mar. 18, 1982, now abandoned.

BACKGROUND AND SUMMARY OF THE INVENTION

The present invention relates to a system for constructing ruled lines in a word processing system.

In the conventional word processing system, the ruled line pattern is treated in a same manner as normal characters. More specifically, in a word processing system including a printer system which forms a single character through the use of a matrix pattern of 16×16 dot positions or 24×24 dot positions, ruled lines are expressed through the use of the matrix pattern. Therefore, in the conventional system, a large capacity is required for memorizing the ruled line information. This is especially true in a Japanese language word processing system where one character data occupies 14 through 16 bits. Thus, in the conventional system, the ruled line data is represented by 14 through 16 bit signals for each line segment.

Accordingly, an object of the present invention is to provide a system for treatment of ruled line which memorizes the ruled line information in a small memory capacity.

Another object of the present invention is to provide a word processing system which ensures single key input of the ruled line information.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a "rule" key, and direction keys ⊖ and ⊕ are provided on a keyboard panel to introduce the ruled line information. The ruled line information is stored in a ruled line memory in a fashion that one pattern is represented by a coded signal of four (4) bits.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a schematic plan view showing a ruled line pattern in a word processing system of prior art;

FIG. 2 is a schematic plan view showing a ruled line pattern in an embodiment of a word processing system of the present invention;

FIG. 3 is a block disgram of an essential part of an embodiment of a word processing system of the present invention;

DESCRIPTION OF THE PREFERRED EMBODIMENTS

Figure 4:
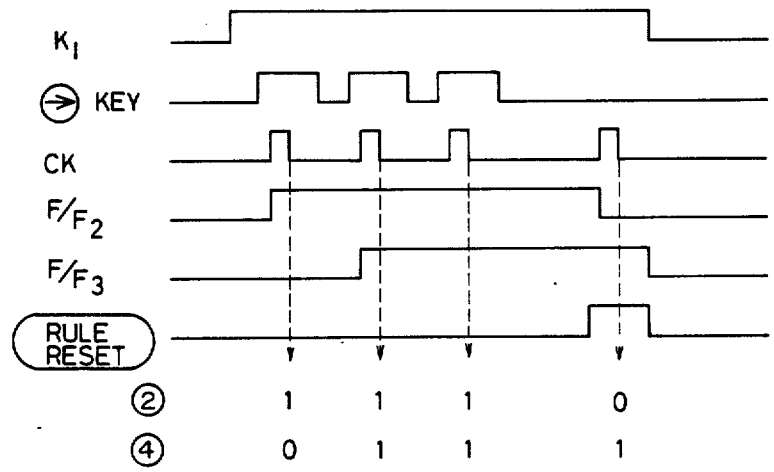
FIG. 4 is a time chart showing various signals occurring within the word processing system of FIG. 3.

Any kinds of ruled lines can be formed by suitably combining the following eleven (11) elements.

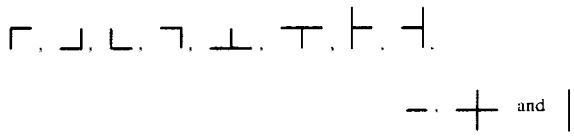

FIG. 1 shows a basic pattern of ruled lines in the conventional word processing system, wherein one character is represented through the use of a matrix pattern of 24×24 dot elements.

Such a ruled line pattern can be divided into four (4) line elements as shown in FIG. 2. That is, any kinds of ruled lines can be formed by combining two (2) vertical ruled line elements ① and ③, and two (2) horizontal ruled line elements ② and ④. In accordance with the present invention, one bit is assigned to each of the ruled line elements ① through ④ to represent the ruled line pattern. Thus, any kind of ruled lines can be represented by a ruled line data in a four (4) bit signal. The four (4) bit assignment is conducted in, for example, the following way.

| BIT | $b_3$ | $b_2$ | $b_1$ | $b_0$ |
|---|---|---|---|---|
| ELEMENT | ④ | ③ | ② | ① |

In this case the ruled line patterns and are represented through the use of the four (4) bit signal in the following way.

⌐ = 0,0,1,1 ("3" in hexadecimal notation)

├ = 0,1,1,1 ("7" in hexadecimal notation)

It will be clear that the ruled line data memory can have a small capacity because the ruled line data uses four (4) bit construction.

The four bit ruled line data is sequentially introduced into and stored in a ruled line buffer memory. The word processing system includes a CRT display unit for displaying the introduced character. The ruled line buffer memory includes memory sections corresponding to the character positions on the CRT display unit. The system is constructed so that the cursor location on the CRT display unit corresponds to the address of the ruled line buffer memory.

A ruled line mode key (RULE), and direction keys ⊖ and ⊕ are provided on a keyboard panel. When, for example, the direction key ⊖ is actuated after actuation of the ruled line mode key RULE, the ruled line data "0010" corresponding to the line element ② is introduced into and stored in the ruled line buffer memory. When the direction key ⊖ is continuously actuated at the time when the cursor location is shifted to the next right character position, the ruled line data "1010" corresponding to the line elements ② and ④ is introduced into and stored in the ruled line buffer memory at the address corresponding to the cursor position.

FIG. 3 shows an essential part of the control circuit of the word processing system of the present invention for conducting the above-mentioned data storage operation.

An address signal representing the cursor location is introduced into an address control circuit 10. The address data is applied to an address counter 12 to select a memory section in a ruled line buffer memory 14 so that the selected memory section corresponds to the cursor location. Now assume that the memory section of the address $A_{m,n}$ is selected by the address counter 12.

When the ruled line mode key (RULE) is actuated, a flip-flop 16 (F/F 1) is set to develop a control signal $K_1$. The thus developed control signal $K_1$ is held till a ruled line mode reset key (RULE RESET) is actuated. The control signal $K_1$ is applied to an OR gate 18 ($G_1$) and AND gates 20 ($G_2$) and 22 ($G_3$). Under the condition where the control signal $K_1$ is developed, when the direction key ⊖ is actuated, a one-shot circuit 24 (OS) which includes an OR gate 26 ($G_4$) and a one-shot multivibrator 28 (M/M) develops a trigger signal CK. A flip-flop 30 (F/F 2) is set at the leading edge of the trigger signal CK. In this way, a data signal "0010" is provided at input lines ④, ③, ② and ① of the ruled line buffer memory 14. The thus provided ruled line data "0010" is written into the ruled line buffer memory 14 at the address $A_{m,n}$ at the timing of the trailing edge of the trigger signal CK. Then, the contents stored in the address counter 12 are increased to select the address $A_{m,n+1}$.

Under these conditions, when the direction key ⊖ is again actuated, the flip-flop 30 (F/F 2) and a flip-flop 32 (F/F 3) are set, whereby a data signal "1010" is provided at the input lines ④, ③, ②, and ① of the ruled line buffer memory 14. The thus provided ruled line data "1010" is written into the ruled line buffer memory 14 at the address $A_{m,n+1}$. When the direction key ⊖ is continuously actuated, the ruled line data "1010" is repeatedly introduced into and stored in the ruled line buffer memory 14 at the address $A_{m,n+i}$.

To terminate the ruled line data input operation, the ruled line mode reset key (RULE RESET) is actuated. The flip-flop 30 (F/F 2) is reset because no input signal is applied thereto. However, the flip-flop 32 (F/F 3) is held in the set condition by means of the trigger signal CK. Therefore, a data signal "1000" is provided on the input lines ④, ③, ② and ① of the ruled line buffer memory 14. Thus, the ruled line data "1000" is written into the ruled line buffer memory 14.

Figure 5:
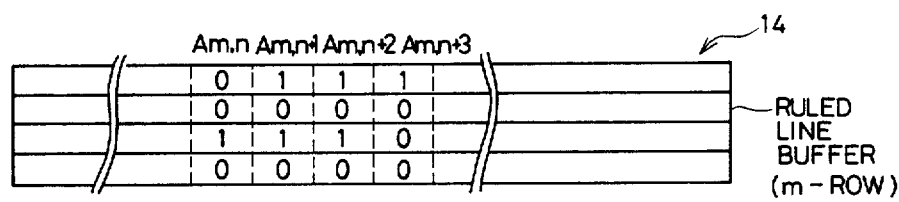
FIG. 5 is a chart showing an example of ruled line pattern data stored in a ruled line buffer memory included in the word processing system of FIG. 3.
Figure 6:
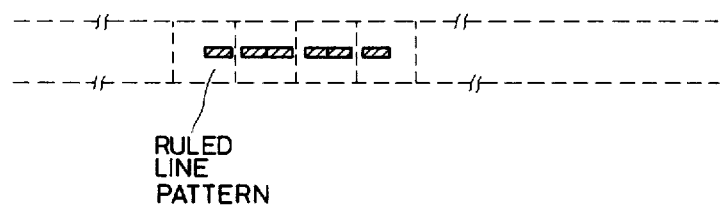
FIG. 6 is a schematic plan view showing a ruled line pattern corresponding to the pattern data of FIG. 5.

FIG. 4 shows the relationships between the above-mentioned signals. FIG. 5 shows the ruled line data stored in the addresses $A_{m,n}$ through $A_{m,n+3}$ of the ruled line buffer memory 14 when the above-mentioned input operation is conducted. FIG. 6 shows the ruled line pattern represented by the ruled line data shown in FIG. 5. It will be clear from FIGS. 5 and 6 that the leftmost position, which corresponds to the address $A_{m,n}$, of the ruled line pattern is formed by the line element ②. The rightmost position, which corresponds to the address $A_{m,n+3}$, of the ruled line pattern is formed by the line element ④. The intermediate sections are formed by the combination of the elements ② and ④.

The vertical ruled line is inputted in a same manner as the horizontal ruled line. Now assume that the cursor is located at the position corresponding to the address $A_{m,n}$. Under these conditions when the ruled line mode key (RULE) is actuated, the flip-flop 16 (F/F 1) is set to develop the control signal $K_1$.

Thereafter, when the direction key ⊕ is actuated, the trigger signal CK is developed to set a flip-flop 34 (F/F 4). A data signal "0001" is provided on the input lines ④, ③, ② and ① of the ruled line buffer memory 14. At this moment, the ruled line data "0010" (which is stored at the address $A_{m,n}$ of the ruled line buffer memory 14) is developed on output lines ①', ②', ③' and ④' of the ruled line buffer memory 14. These two data signals are combined at OR gates 36, 38, 40 and 42, and the combined data "0011" is written into the memory section of the address $A_{m,n}$ of the ruled line buffer memory 14.

Then, the address control circuit 10 is operated to select the next under address $A_{m+1,n}$. When the direction key ⊕ is continuously actuated, a flip-flop 44 (F/F 5) is set because the flip-flop 34 (F/F 4) is held at the set state. A data signal "0101" is provided on the input lines ①, ②, ③ and ④ of the ruled line buffer memory 14, and the ruled line data "0101" is written into the ruled line buffer memory 14 at the address $A_{m+1,n}$. When the ruled mode reset key (RULE RESET) is actuated, the flip-flop 34 (F/F 4) is reset, and the flip-flop 44 (F/F 5) is held at the set state. Therefore, the ruled line data "0100" is written into the ruled line buffer memory 14.

Figure 7:
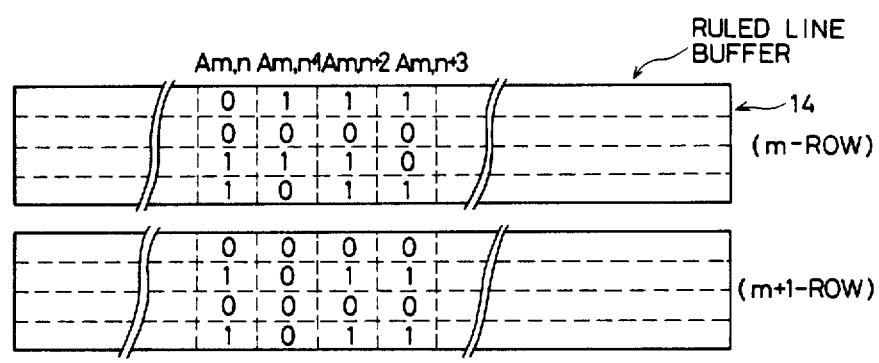
FIG. 7 is a chart showing another example of ruled line pattern data stored in a ruled line buffer memory included in the word processing system of FIG. 3.
Figure 8:
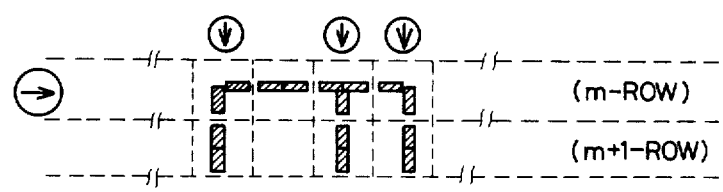
FIG. 8 is a schematic plan view showing a ruled line pattern corresponding to the pattern data of FIG. 7.

FIG. 7 shows an example of the ruled line data which represents the combined horizontal and vertical ruled line pattern. FIG. 8 shows the ruled line pattern corresponding to the ruled line data shown in FIG. 7.

The display control for the ruled line pattern is easily conducted by gating the ruled line data in synchronization with the horizontal timing signal and the vertical timing signal of the CRT display.

When the flip-flop 16 (F/F 1) is held in the reset state, the cursor is shifted to a desired position on the CRT display unit through the use of the direction keys ⊖ and ⊕.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of constructing rule lines in a word processing system comprising:
   introducing rule line data into said system, said rule line data comprising data bit elements, each associated with a character position and representing up, down, left and right segments which collectively, when displayed, resemble a cross (+) substantially centered in said character position, said data bit elements each representing a presence or absence of said segments at a said character position; and
   storing said rule line data in a memory for later recall.

2. The method of claim 1 further comprising: recalling said rule line data from said memory; and displaying said rule lines indicated by said data.

3. The method of claim 1 wherein said data bit elements consist of four binary bits, each said bit representing a presence or absence of one of said segments at a corresponding said character position.

4. A system for constructing rule lines in a word processing system comprising:
 rule line data entry means for introducing rule line data into said word processing system, said rule line data comprising data bit elements, each associated with a character position and representing up, down, left and right segments which collectively, when displayed, resemble a cross (+) substantially centered in said character position, said data bit elements each representing a presence or absence of said segments at said character position;
 memory means for storing said rule line data at locations corresponding to each character position for later recall.

5. The system of claim 4 wherein said entry means includes a rule mode key for placing the word processing system in a rule line data input mode;
 rule direction selection means for selecting a vertical or horizontal rule; and
 rule line data developing means responsive to said rule mode key and rule direction selection means for developing said rule line data.

6. The system of claim 5 wherein said rule line data developing means determines whether both said left and right segments are to be represented at a corresponding said bit of a said character position by a presence of a rule line in an horizontally adjacent character position;
 said rule line data developing means likewise determining whether both said top and bottom segments are to be represented by a presence of a rule line in a vertically adjacent character position.

7. The system of claim 4 wherein said ruled line data corresponding to each character position consists of four binary bits, each said bit representing a presence or absence of one of said segments at a corresponding said character position.

8. The system of claim 4 further comprising means for recalling said rule line data and displaying said rule lines indicated by said data.

9. In a word processing apparatus for developing character information at a plurality of character locations, a system for constructing rule lines comprising:
 rule line data entry means for introducing rule line data into said word processing system, said rule line data comprising data bit elements, each associated with a character position and representing up, down, left and right segments which collectively, when displayed, resemble a cross (+) substantially centered in said character position, said data bit elements each representing a presence or absence of said segments at said character position;
 memory means, responsive to said entry means, for storing said rule line data therein, each said data bit element of said rule line data being stored at a location corresponding to the associated said character position;
 said rule line data entry means including,
  state storage means for memorizing the presence of said segments associated with the last introduced said data bit element,
  means for introducing rule line data related to a present data bit element using a single input for a rule line in a horizontal direction and a signal input for a rule line in a vertical direction,
  rule line data creation means for memorizing said last introduced said data bit element and for automatically developing both said right and said left segments in response to a single user request when said last introduced data element associated with a character position horizontally adjacent to said present data element contains an adjacently disposed said segment, said ruled line data creation means similarly automatically developing both said up and down segments in response to a single user request when said last introduced data bit element associated with a character position vertically adjacent to said present data element contains an adjacently disposed said segment.

10. The system of claim 9 wherein said means for introducing includes a rule mode key for placing said word processing system in a rule line development mode; and
 rule line direction selecting means for selecting said single inputs for a rule line in a vertical or a horizontal direction for the development of said data elements by said rule line data creation means.

11. The system of claiim 10 further comprising:
 inhibition means for disabling said rule line data entry means when said word processing system is not placed in said rule line data development mode by actuation of said rule mode key.

12. The system of claim 11 further comprising:
 rule mode reset key for resetting said rule line development mode by activating said inhibition means.

13. The system of claim 10 further comprising means for recalling said rule line data and for displaying said rule lines.

14. The system of claim 9 wherein said data bit elements consist of four binary bits, each said bit representing a presence or absence of one of said segments at a corresponding said character position.

* * * * *